UNITED STATES PATENT OFFICE.

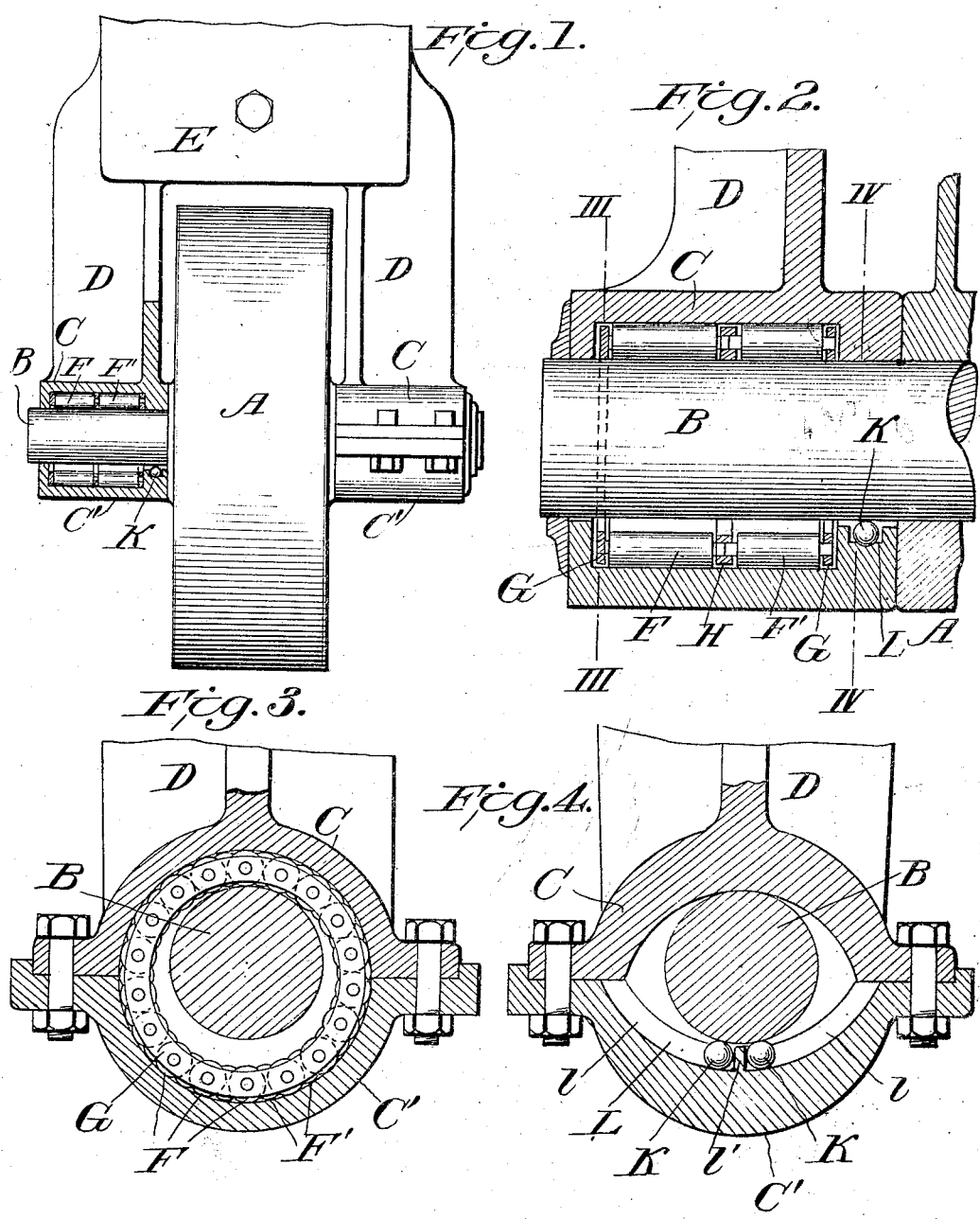

JOHN H. CARR, OF ALHAMBRA, CALIFORNIA.

ROLLER-BEARING.

1,139,161. Specification of Letters Patent. Patented May 11, 1915.

Original application filed September 16, 1913, Serial No. 789,967. Divided and this application filed February 16, 1914. Serial No. 819,040.

*To all whom it may concern:*

Be it known that I, JOHN H. CARR, a citizen of the United States, residing at Alhambra, in the county of Los Angeles and State of California, have invented certain new and useful Improvements in Roller-Bearings, of which the following is a full, clear, and exact specification.

This invention relates to roller bearings for axles, especially designed for use with the wheel axles of vehicles, and it has for its object to greatly reduce friction; this application being a division of my application filed September 16, 1913, Serial No. 789,967.

The invention will first be hereinafter described in connection with the accompanying drawings, which constitute a part of this specification, and then more specifically defined in the claims at the end of the description.

In the accompanying drawings, wherein similar reference characters are used throughout the several views to designate corresponding parts of the invention; Figure 1 is a broken front elevation of a caster wheel equipped with bearings constructed in accordance with my invention, the bearing for the portion of the axle at one side of the wheel being shown in section. Fig. 2 is an enlarged longitudinal section through one of the bearings; Fig. 3 is a cross section on the line III—III of Fig. 2, through the roller bearing proper, and Fig. 4 is a cross section on the line IV—IV of Fig. 2, through the grooves for the key-balls.

While I have elected to illustrate my improved bearing as applied to a caster wheel, it will be understood that it may be used with equal success on other types of axles or wheels. As illustrated, the wheel A is mounted on a shaft or stub axle B which extends in opposite directions into journals C at the lower ends of the forks D of the caster bracket E.

Each bearing, as used on each end of the axle B, preferably includes two or more sets of rollers F and F', the rollers of one set being staggered with respect to those of the other set. It is evident that in rolling, the axle must move over the rollers in succession and, consequently, pass over the top of one roller into the space between it and the next one, and then climb up on the next roller and so on, so that, while the effect of this climbing and falling may hardly be noticed, yet it is undoubtedly causing friction and jarring all the time which can only be overcome by reducing the diameter of the rollers and inserting many more. Theoretically, this friction may only be eliminated by inserting an infinite number of rollers of infinitely small diameter so as to provide a continuously rolling surface. The present construction reduces this friction materially or to a certain extent (hitherto neglected) by staggering the rollers so that as they come successively over the ridge of the axle twice as many rollers pass over the axle and the size of the valleys between successive rollers is reduced one half as compared to the standard bearing.

The rollers may be held in proper position by a pair of end spacer rings G and an intermediate spacer ring H, the latter serving for both sets of rollers, as best illustrated in Fig. 2.

In order to further reduce the friction, the inside diameter of the roller bearings is enlarged beyond the diameter of the axle, so that only a few of the rollers, theoretically only two at the most, bear on the axle at the same time. While it is evident that this clearance of the axle would offer opportunity for continuous vibration and jars which would be detrimental to the whole of the vehicle if provision is not made against it, this construction is turned to advantage by introducing two balls K into the two sections *l, l* of a groove L at one end of the bearing. This groove L is formed with a radius considerably greater than that of the axle, as clearly shown in Fig. 4, and is evenly divided one each side of the axle, the lowest point of said groove being located immediately below the center of the axle. At this middle and lowest point of the groove, a partition *l'* is formed, dividing the groove into the sections *l, l*, already mentioned. This partition separates the two balls K and prevents either of them from passing beyond the vertical center line of the axle. In fact, said partition keeps the balls a fraction of an inch to either side of said vertical center line, so that they cannot become wedged below the axle but are both free to move outward in their respective groove sections. This arrangement of grooves and balls prevents the axle from pumping and at the same time permits it to give laterally when subjected to heavy shocks, thus providing relief and still preventing a violent recoil. In fact, the insertion of the balls in the groove, as described and illustrated, makes a simple, cheap and efficient shock absorber.

It will be understood, of course, that the bearing may be bathed in oil, if desired. For protection, dust rings M are put on the outer ends of the journals as shown in Figs. 1 and 2. It will also be noted that the lower half C' of each journal is removable to permit the parts to be readily assembled.

Having thus described my invention, what I claim as new and desire to secure by Letters Patent of the United States is:

1. The combination with an axle, of a journal, a part of which is of greater diameter than said axle, bearing elements mounted in said enlarged part of the journal, there being a groove in the journal extending below the axle and a ball in said groove and contacting with the under surface of the axle.

2. The combination with an axle, of a journal, a part of which is of greater diameter than said axle, a roller bearing comprising a set of rollers and spacer rings of greater diameter than the axle and arranged in the enlarged part of the journal, there being a groove in the journal arranged at one end of the enlarged portion and extending below the axle, and a ball in said groove and contacting with the under surface of the axle.

3. The combination with an axle, of a journal, a part of which is of greater diameter than said axle, a roller bearing comprising sets of rollers and spacer rings of greater diameter than the axle and arranged in the enlarged part of the journal, there being a groove in the journal arranged at one end of the enlarged portion and extending below the axle, said groove being formed on a curve of greater radius than the axle, and a ball in said groove and contacting with the under surface of the axle for the purpose specified.

4. The combination with an axle, of a journal, a part of which is of greater diameter than said axle, a roller bearing comprising sets of rollers and spacer rings of greater diameter than the axle and arranged in the enlarged part of the journal, there being a groove in the journal arranged at one end of the enlarged portion and extending below the axle, said groove being formed on a curve of greater radius than the axle and arranged eccentrically of the latter, and a ball in said groove and contacting with the under surface of the axle for the purpose specified.

5. The combination with an axle, of a journal, a part of which is of greater diameter than said axle, a roller bearing comprising sets of rollers and spacer rings of greater diameter than the axle and arranged in the enlarged part of the journal, there being a groove in the journal arranged at one end of the enlarged portion and extending below the axle, said groove being formed on a curve of greater radius than the axle and arranged eccentrically of the latter, the lowest point of said groove being located directly below the vertical center line of the axle, and a ball in said groove and contacting with the under surface of the axle for the purpose specified.

6. The combination with an axle, of a journal, a part of which is of greater diameter than said axle, a roller bearing comprising sets of rollers and spacer rings of greater diameter than the axle and arranged in the enlarged part of the journal, there being a groove in the journal arranged at one end of the enlarged portion and extending below the axle, said groove being formed on a curve of greater radius than the axle and arranged eccentrically of the latter, the lowest point of said groove being located directly below the vertical center line of the axle, a partition in said groove at the lowest point thereof, and two balls in said groove, one on each side of said partition, said balls contacting with the under surface of the axle for the purpose specified.

In testimony whereof I have signed my name to this specification in the presence of two attesting witnesses.

JOHN H. CARR.

Witnesses:
ROBERT A. WALKER,
JAMES C. KEELER.